United States Patent

[11] 3,572,032

| [72] | Inventor | William M. Terry |
| | | 2624 Carolina Way, Houston, Tex. 77005 |
| [21] | Appl. No. | 745,896 |
| [22] | Filed | July 18, 1968 |
| [45] | Patented | Mar. 23, 1971 |

[54] IMMERSIBLE ELECTROHYDRAULIC FAILSAFE VALVE OPERATOR
5 Claims, 1 Drawing Fig.

[52] U.S. Cl............................................................ 60/52
[51] Int. Cl...................................................... F15b 15/18
[50] Field of Search............................................. 60/52
(C.O.), 52 (T), 52 (U.S.), 51; 91/5, 441,
(Inquired)

[56] References Cited
UNITED STATES PATENTS

| 3,046,743 | 7/1962 | Burley | 60/52B |
| 3,466,001 | 9/1969 | Nelson | 251/327X |
| 1,993,612 | 3/1935 | Lum | 60/52U.S.X |
| 2,399,294 | 4/1946 | Ray | 60/52T |
| 2,597,050 | 5/1952 | Audemar | 60/51X |
| 2,671,317 | 3/1954 | Heintzelman | 60/52T |
| 3,163,985 | 1/1965 | Bouyoucos | 60/51 |
| 3,440,825 | 4/1969 | Lloyd | 60/51UX |
| 3,436,914 | 4/1969 | Rosfelder | 60/51 |

*Primary Examiner*—Edgar W. Geoghegan
*Attorneys*—James A. Reilly, John B. Davidson, Lewis H. Eatherton and James E. Reed ABSTRACT: An electrohydraulic valve operator for remote undersea operation in which all the working components are immersed in hydraulic fluid and maintained at ambient hydrostatic pressure. A spring or other biasing means is used to provide fail-safe operation.

PATENTED MAR 23 1971
3,572,032
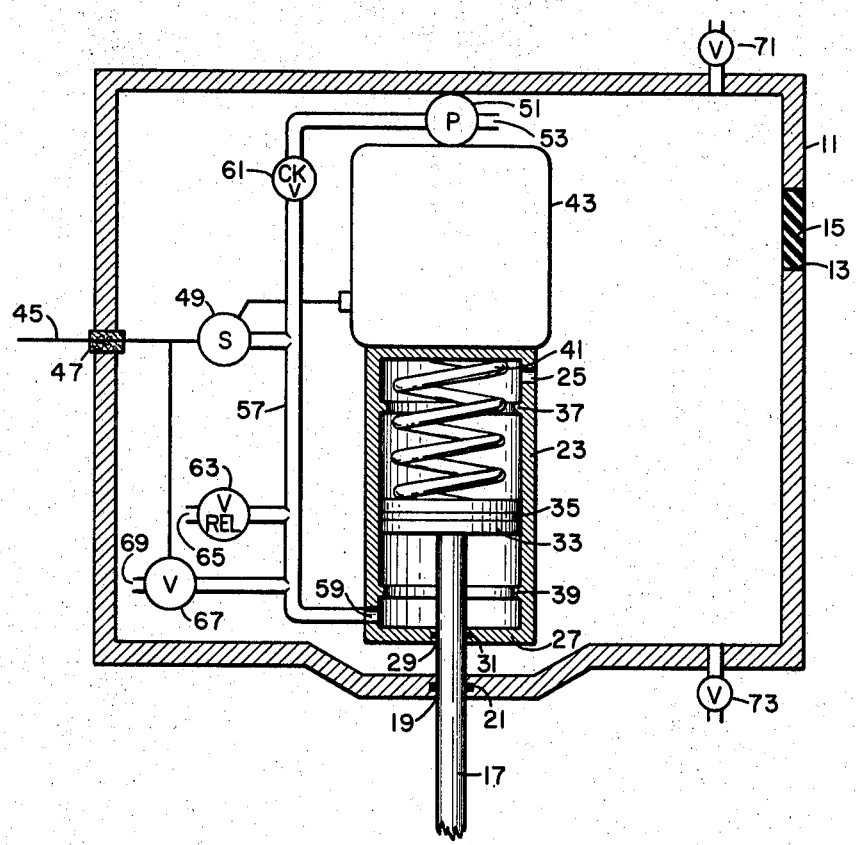
WILLIAM M. TERRY
    INVENTOR.
BY James E. Reed
ATTORNEY

IMMERSIBLE ELECTROHYDRAULIC FAILSAFE VALVE OPERATOR

BACKGROUND OF THE INVENTION

1. Field of the Invention

This invention is generally concerned with valve operators for underwater service. More particularly, the invention is concerned with an electrohydraulic fail-safe valve operator in which all working components are immersed in hydraulic fluid and maintained at ambient hydrostatic pressure.

2. Description of the Prior Art

The development of offshore crude oil and natural gas reservoirs has emphasized the need for more effective means for controlling underwater valves and similar equipment. Because of the inaccessibility of such equipment, valves and related devices are generally controlled from a platform or other structure at the water surface. The reliability of operation of remotely located valves is extremely important. Typically, such valves are hydraulically actuated fail-safe valves. The hydraulic fluid is pressurized at the surface on a platform or similar structure and stored in an accumulator vessel. The pressurized hydraulic fluid is transmitted to the subsurface valves through hydraulic lines whenever it is necessary to operate the valves. These hydraulic lines are exposed throughout their length to the subsea environment. Corrosion, fatigue, and mechanical abrasion in combination with the high-pressure hydraulic fluid within the lines result in frequent leaks in the hydraulic lines. This leads to failure of the valves, pollution of the water, and associated problems.

Where a series of valves are clustered at an underwater location, as is the case with a submarine wellhead, the hydraulic fluid is normally transmitted from the accumulator to the particular valve to be controlled in one of two ways. The first utilizes a series of parallel hydraulic lines which extend from the surface to the apparatus to be controlled. A separate line or pair of lines is used to operate each valve. The resultant bundle of hydraulic lines is both unwieldy and expensive in comparison with the use of a single supply line. In addition, leaks in a line are difficult to locate. The second utilizes a single hydraulic supply line in combination with an underwater hydraulic sequencing switch that is located in proximity to the valves and that routes the hydraulic fluid to the various control points in response to coded surface-initiated pressure pulses. The hydraulic line is again exposed throughout its length to the subsea environment. The sequencing switch apparatus is complex and requires many moving parts which increases the probability of mechanical failure. Neither of these systems is completely reliable.

SUMMARY OF THE INVENTION

The valve operator of this invention alleviates many of the problems inherent in existing systems. The valve operator includes a housing which contains all the components of the operator in a bath of hydraulic fluid. Means for equalizing pressure within the housing with that of the surrounding water are provided. A reciprocatable piston is disposed within a hollow hydraulic cylinder contained in the housing. This po piston is connected to a slidable valve actuator rod that extends through an opening in the housing wall. A biasing means urges the piston to extend the actuator rod outwardly relative to the housing in its normal position. Means are mounted within the housing for forcing hydraulic fluid contained within the housing into the cylinder to force the piston to overcome the biasing means and thereby retract the actuator rod inwardly relative to the housing. This forcing means is responsive to an external electric signal. Such signals are transmitted from a surface control unit to the operator through an insulated electric conduit.

Because the valve operator of the invention has its hydraulic oil reservoir and all other components within the housing, the necessity for extending hydraulic lines from a surface control point to the valve operator is eliminated. External control is provided by a relatively trouble-free insulated electric a cable. A single electric cable containing a number of conductors can be used where a cluster of valves must be controlled. The necessity of mounting the motor and pump in a watertight, high-pressure vessel is eliminated by using submersible components and immersing them in an oil bath maintained at ambient hydrostatic pressure. Because of these and other advantages, the valve operator of the invention represents a significant improvement over those available heretofore.

BRIEF DESCRIPTION OF THE DRAWING

The drawing depicts schematically an elevation view of the electrohydraulic valve actuator of the invention.

DESCRIPTION OF THE PREFERRED EMBODIMENTS

The valve operator of the invention, as shown in the drawing, includes a housing 11. The interior of the housing serves as a reservoir for hydraulic fluid. This reservoir may be open at the bottom to permit pressure equalization but will preferably be sealed by means of a diaphragm or similar device corrosion and prevent the entry of marine organism. The upper part of the reservoir should be enclosed to preclude escape of the hydraulic oil. The housing may be constructed of a corrosion-resistant steel alloy such as nickel-chromium steel or stainless steel, but since only small amounts of oxygen are normally found below a depth of 50 feet, corrosion may not be a significant problem in deep water. Where deep water service is contemplated, a mild steel housing may therefore be satisfactory.

Pressure equalization in the valve operator shown in the drawing is accomplished by means of an opening 13 extending through the housing wall. This opening is covered by a flexible diaphragm 15. The diaphragm is impermeable and serves to equalize the pressure of the hydraulic oil within the housing with the hydrostatic pressure of the water outside without permitting any water to enter the housing. Such a diaphragm can be made of neoprene, oil-resistant rubber, or a similar material that is flexible, that is not subject to corrosion, and that will not decompose from exposure to hydraulic fluid. Alternatively, a bellows, piston, or other mechanical device could be used to equalize pressure within the housing with that of the marine environment. As pointed out above, the bottom of the housing can also be left open to permit the entry of sufficient water to equalize the pressure. Gravity segregation of the oil and water prevents contamination of the hydraulic fluid in a system of the latter type.

Actuator rod 17 extends through opening 19 in the outer housing. This rod slides through sealing members 21 to prevent contamination of the hydraulic fluid with sea water. The sealing members may be O-rings, chevron seals, or similar wiping members. A stuffing box could also be used. If corrosion is apt to be a problem, rod 17 may be made of a noncorrosive steel alloy such as nickel-chromium steel or stainless steel. For service in water depths in excess of 50 feet, however, the rod can usually be constructed of mild steel. In the event an actuator housing with an open bottom is used, the rod can extend through the opening and the sealing members otherwise required can be dispensed with.

A hydraulic cylinder 23 is located within the outer housing, preferably with its longitudinal axis in alignment with rod 17 and opening 19 as shown. The cylinder may be an integral part of the housing. Although it is preferred that the longitudinal axis of the cylinder and the rod and port be aligned. It will be apparent that a mechanical linkage could be used with an offset rod. The cylinder contains an exhaust port 25 in one end which is open to the hydraulic fluid reservoir. This port allows the incompressible hydraulic fluid to escape into the hydraulic fluid reservoir as the piston advances. The opposite, inlet end of the cylinder is capped by plate 27 containing an aperture 29 which is shaped to generally conform to the cross section of rod 17. The aperture is preferably located in the center of the plate. The actuator rod extends through this aperture. Seal members 31 prevent hydraulic fluid from escaping through the aperture. These seal members can be O-rings, chevron seals, or other wiping seals and are preferably mounted in grooves in the end plate of the hydraulic cylinder.

A Hydraulic piston 33 is disposed within cylinder 23. This piston reciprocates within the cylinder and is connected to actuator rod 17. A pressure-tight seal is maintained between piston 33 and cylinder 23 by means of seal member 35 which may be an O-ring or similar type seal. Piston travel is limited by exhaust end stops 37 and inlet end stops 39.

A compression spring 41 or other biasing member is positioned within cylinder 23 between the piston and the exhaust end to force the piston against inlet end stops 39. This piston position corresponds to the normally closed position of the valve when no hydraulic pressure is being exerted on the inlet end of the piston. A tension spring surrounding the rod may be used in lieu of or in addition to the spring shown if desired.

Electric motor 43 is mounted within the housing and thus immersed in the hydraulic fluid. This motor can be either AC or DC and may be either totally enclosed or submersible. An AC polyphase motor with wet windings is preferred. Power cable 45 enters housing 11 through waterproof bulkhead connector 47 and is connected to the electric motor. Electric cable 45 is energized from an external source, not shown, when it is desired to start the motor and thereby open the valve to which the operator is connected.

Pressure switch 49 is included in the electric motor circuit and is mounted between check valve 61 and relief valve 63 on line 57. This pressure switch closes the electric circuit between power source 45 and electric motor 43, thereby energizing the electric motor whenever pressure within line 57 is below a preset level required to hold piston 33 against exhaust end stops 37. The pressure switch breaks the circuit when a preset maximum pressure level is attained to stop the motor and pump.

Hydraulic pump 51 is actuated by electric motor 43. The hydraulic pump may be a gear, vane, or piston pump. The size and power consumption of the pump selected are determined by the force required to overcome the biasing member and open the valve. Intake port 53 is open to the hydraulic fluid reservoir. The pump discharges into hydraulic line 57 which leads to inlet port 59 of cylinder 23. Check valve 61 is mounted on line 57 to prevent backflow from the cylinder to the pump. Relief valve 63 is mounted on line 57 between the check valve and the cylinder inlet port. The relief valve may be a spring-loaded poppet valve or other suitable device. Any valve that will open when line pressure reaches a predetermined high level to protect the other components in the system against pressure surges within line 57 will ordinarily be satisfactory. Outlet port 65 of relief valve 63 vents to the hydraulic fluid reservoir. Dump valve 67 is mounted on line 57 between relief valve 63 and cylinder inlet port 59. The function of this valve is to release the pressure within the hydraulic cylinder in the event of a power failure. The dump valve preferably is a normally open solenoid valve which is closed whenever power source cable 45 is energized. Outlet port 69 of the dump valve opens to the hydraulic fluid reservoir. Valves 71 and 73 are of conventional design and are used for filling and draining the hydraulic fluid reservoir.

To open the valve, power source 45 is energized by an external electric signal. Dump valve 67, which is normally open, is thus energized, causing it to close. A low-pressure condition exists within line 57. Pressure switch 49 is closed because of this low-pressure condition so that electrical energy is free to travel from power source 45 to electric motor 43. The electric motor operates hydraulic pump 51 which withdraws hydraulic fluid from the hydraulic fluid reservoir, pressurizes it, and discharges it into hydraulic line 57. Line 57 conducts the fluid to cylinder inlet port 59 which admits the hydraulic fluid into the space between the inlet end of the cylinder and the piston. Motor 43 continues to pump hydraulic fluid until cylinder pressure builds up to the level required to overcome spring or bias 41 and thereby lift piston 33 to the open position. Piston travel is limited by exhaust end stops 37. Pressure will continue to build up for a short interval after the piston is locked in place. When the preset maximum pressure level is reached pressure switch 49 opens, thus breaking the electric circuit and stopping electric motor 43. With piston 33 in the open position, rod 17 is raised, causing the valve to open. The piston, rod, and valve will remain in their positions as long as the hydraulic pressure within line 57 and the hydraulic cylinder remains at or above the level required to overcome biasing member 41. If the motor and pump overrun for a period sufficient to create an excessive pressure surge, relief valve 63 opens to vent hydraulic fluid from line 57 to the hydraulic reservoir, thereby alleviating the high-pressure condition. Should pressure gradually leak off within line 57 and within the inlet end of cylinder 23, pressure switch 49 will close again, causing electric motor 43 to actuate hydraulic pump 51 until such time as sufficient pressure is built up to lift the piston again and open pressure switch 49.

To close the valve, power cable 45 is deenergized. Dump valve 7 67 is thus deenergized and assumes its normally open position. This allows hydraulic fluid contained within line 57 and within the inlet end of cylinder 23 to escape to the hydraulic fluid reservoir through port 69 of the dump valve. Fluid will continue to escape until such time as the spring urges the piston downwardly against inlet cylinder end stops 39, returning rod 17 to its original position and thereby closing the valve. Thus, in the event of power failure, the valve assumes a normally closed position.

I claim:

1. A valve operator for underwater service comprising:
   a. a housing containing an opening in the wall thereof, the interior of said housing forming a hydraulic fluid reservoir;
   b. means for maintaining pressure within the housing at the ambient water pressure level, said means preventing water from entering said housing;
   c. a slidable actuator rod extending through a seal member mounted within the opening;
   d. a hollow cylinder in the housing having an inlet and an exhaust end, said exhaust end open to the interior of said housing;
   e. a piston disposed within the cylinder, slidable therewithin, and connected to the actuator rod;
   f. means for biasing the piston toward the inlet end of the cylinder; and
   g. means in the housing for forcing hydraulic fluid from within the housing into the inlet end of the cylinder in response to an external signal.

2. A valve operator as defined by claim 1 wherein the means for maintaining pressure within the housing is an impermeable, flexible diaphragm.

3. A valve operator for underwater service comprising:
   a. an impermeable housing having a first and a second opening in the wall thereof, the interior of said housing forming a hydraulic fluid reservoir;
   b. an impermeable, flexible diaphragm sealed to the housing, covering the first opening and preventing water from entering the housing;
   c. a slidable actuator rod extending through a seal member mounted within the second opening;
   d. a hollow cylinder in the housing aligned with the rod and the second opening and having an outlet end and an inlet end that has a port containing a seal through which the rod extends, said outlet end open to the interior of the housing;
   e. a slidable piston within said cylinder and connected to the rod;
   f. a compression spring within the cylinder between the outlet end and the piston that biases the piston toward the inlet end of the cylinder; and
   g. means in said housing for forcing hydraulic fluid from within the housing into the inlet end of the cylinder in response to an external signal.

4. A valve operator as defined in claim 3 wherein the forcing means includes a pump having an inlet end within the housing and a discharge end connected to the inlet end of the cylinder, and an electric motor for driving the pump.

5. An underwater valve actuator assembly comprising:
 a. a housing capable of retaining a hydraulic fluid, the interior of said housing forming a hydraulic fluid reservoir;
 b. a hydraulic motor disposed within the housing and having an inlet end and an outlet end, said outlet end open to the interior of the housing;
 c. a pump for injecting the hydraulic fluid from said housing into the inlet end of said motor at a pressure in excess of that in said housing;
 d. means connected to the motor for actuating a valve associated with the actuator assembly in response to injection of the hydraulic fluid into the motor; and
 e. means for maintaining hydraulic fluid within the housing at a pressure corresponding to the surrounding water pressure, said means preventing water from entering said housing.

UNITED STATES PATENT OFFICE
CERTIFICATE OF CORRECTION

Patent No. 3,572,032                    Dated    March 23, 1971

Inventor(s)   William M. Terry

It is certified that error appears in the above-identified paten and that said Letters Patent are hereby corrected as shown below:

In the bibliographic data, add:

-- [73] Assignee   Esso Production Research Company --
                   Houston, Tex.
                   a corporation of Delaware Signed and sealed this 7th day of September 1971.

(SEAL)
Attest:

EDWARD M. FLETCHER, JR.              ROBERT GOTTSCHALK
Attesting Officer                    Acting Commissioner of Pate